Nov. 30, 1965   F. CASSANI   3,220,485
CONTROL SYSTEM FOR A TOOL-LIFTING DEVICE FOR TRACTORS
Filed Nov. 8, 1963   9 Sheets-Sheet 2
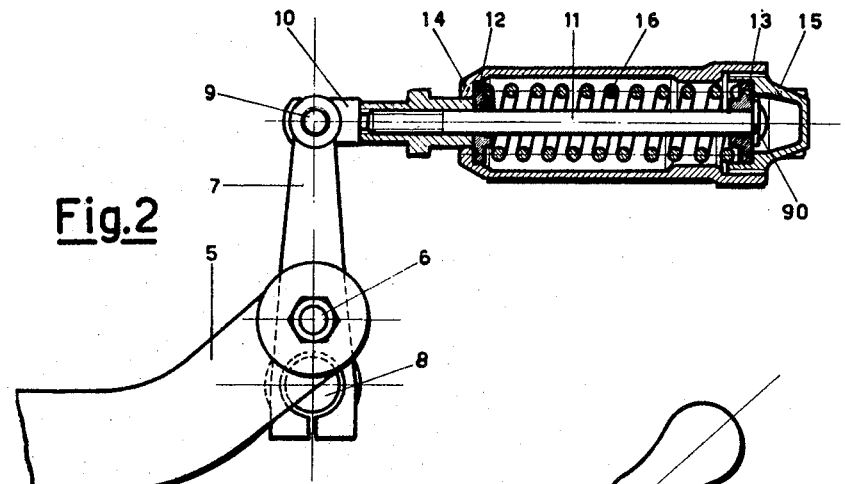
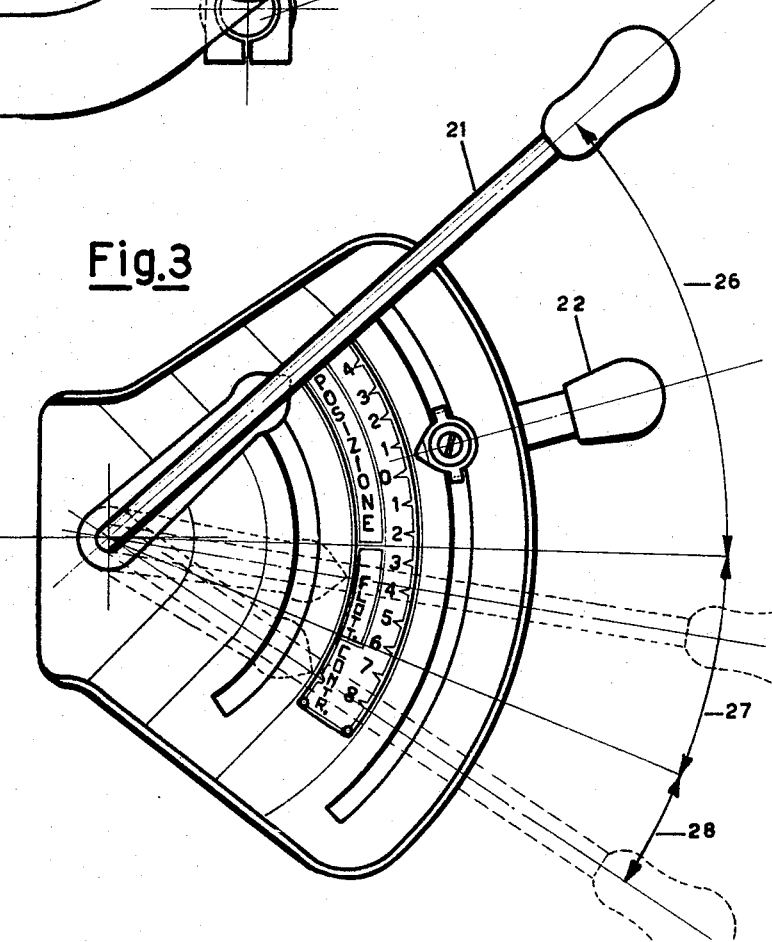
INVENTOR
Francesco Cassani
BY *Stevens, Davis, Miller & Mosher*
ATTORNEYS Nov. 30, 1965  F. CASSANI  3,220,485
CONTROL SYSTEM FOR A TOOL-LIFTING DEVICE FOR TRACTORS
Filed Nov. 8, 1963  9 Sheets-Sheet 4

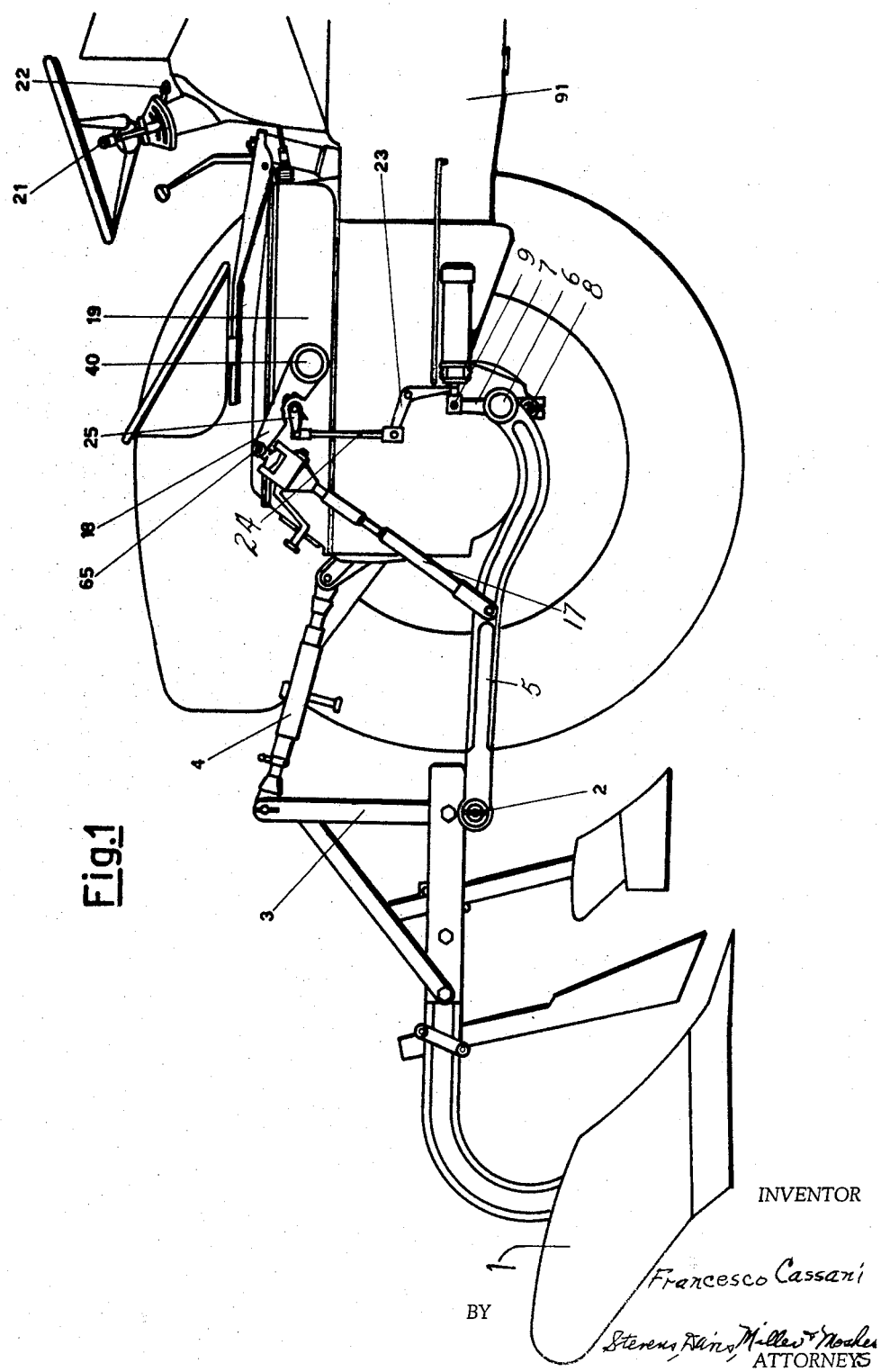

INVENTOR
Francesco Cassani
BY Stevens, Davis, Miller & Mosher
ATTORNEYS

Nov. 30, 1965   F. CASSANI   3,220,485
CONTROL SYSTEM FOR A TOOL-LIFTING DEVICE FOR TRACTORS
Filed Nov. 8, 1963   9 Sheets-Sheet 5

INVENTOR
Francesco Cassani
BY Stevens Davis,
Miller & Mosher
ATTORNEYS

United States Patent Office 3,220,485
Patented Nov. 30, 1965

3,220,485
CONTROL SYSTEM FOR A TOOL-LIFTING DEVICE FOR TRACTORS
Francesco Cassani, Treviglio, Italy, assignor to S.A.M.E., Societa Accomandita Motori Endotermici F. Cassani & C., Treviglio, Italy, an Italian company
Filed Nov. 8, 1963, Ser. No. 322,424
Claims priority, application Italy, Nov. 9, 1962, 22,193/62, Patent 678,034
7 Claims. (Cl. 172—9)

The present invention relates to an engine-driven device adapted to lift and lower an attachment for tools applied on the rear portion of a tractor.

Valve means, actuated by two different control systems commonly called the one "position control" or "controlled-position system" and the other one called "reaction-control," "draft control," or "controlled-effort system," are provided to adjust the flow of fluid under pressure towards or from the actuator of the device.

By the controlled-position system, the attainment and keeping of a position of the tool attachment is obtained relative to the tractor, corresponding to a position predetermined by the operator, whilst by the controlled-effort system there is obtained the maintainment of an effort of traction or of thrust upon the attachment, at a value determined by the operator independently of the undulations of the ground on which the tractor bears: in both cases with a possibility of varying at the operator's will, even during work, the value that determines the position of the attachment or the effort of traction or of thrust upon the attachment.

There are known means for controlling the depth of the tool, which have two levers available for hand control, one of which determines by its position the maximum depth that the tool can attain, and the other one determines the maximum effort of traction to which the tool can be subjected.

With these devices the depth attainable by the tool is constantly limited by two conditions which are to be respected contemporaneously: namely, the depth should never be greater than the maximum depth prefixed and at the same time it should not cause upon the tool an effort greater than the maximum prefixed.

Those devices involve the advantage of utilizing that double contemporaneous adjustment; this advantage, however, involves the arising of inconveniences in determined conditions. For instance, during work at controlled effort, the digging by the tool is effected by controlling a hand-actuated lever, that displaces the valve means in such a way as to open the discharge apertures which allow the fluid to flow off from the actuator until the tool in digging causes an effort upon the attachment that is equal to the value determined by the position of the lever that determines the value of the effort.

Since the speed of descent of the tool is variable being a function of the width of the aperture of discharge and since the aperture of discharge diminishes proportionally with the approach to the depth at which an effort is attained equal to the predetermined value, as a consequence the speed of digging of the tool diminishes while the tool is descending.

During the ploughing work with which the digging takes place, while the tractor advances with valve means having their discharge ports open, utilizing the above mentioned devices, the bottom of the furrow will have at the beginning an inclination that progressively diminishes until attaining the working plane when the predetermined effort is attained, and the desired depth of the furrow will be attained only afterwards, when the tool has been forwarded by a considerable path. Moreover there are works wherewith the tool (for instance a sowing tool) requires a very small maximum towing effort; in these cases, if the tool is lifted at the end of the furrow out of touch with the ground the elastic elements reacting to the effort of traction displace themselves by a small proportional amount from the position in which the controlled-effort system prevails over the controlled-position system.

It then frequently happens that by effect of the jumps and jerks of the tractor as due to the irregularities of the ground, the elastic elements are compressed and expanded making the controlled-effort system to prevail over the controlled-position system, therefore causing continual unintentional variations of the tool position by discharging or feeding fluid from or to the actuator respectively.

One object of the present invention is to facilitate the digging-in of the tool so as to get the least possible length of ground not worked at the desired depth, which ground then would have to be worked in successive operations to make all of the work to arrive at the desired depth.

It is another object to eliminate the possibility of influencing the valve means through the controlled-effort system when the tool is lifted for transport or at any rate when the tool is controlled by the controlled position system. Still another object is to allow the operator to choose between maximum depth or maximum effort of traction to obtain the desired tool depth. Moreover, a further object of the present invention is to afford a third system in addition to the controlled-position and controlled-effort systems, which we shall call floating system, whereby the tool is free to bear upon the ground and to dig-in according to the digging possibilities of said tool, up to the maximum limit of vertical oscillation of the attachment without any possibility of being influenced by the controlled-position system or by the controlled-effort system whatsoever the position of the manual lever for determining the value of the effort may be.

Other objects and advantages of the present invention will appear with evidence from the following detailed description of the preferred embodiment of the present invention, illustrated merely by way of example in the drawings:

FIG. 1 shows a side view of an agricultural tool carried by the front part of a tractor.

FIG. 2 shows a longitudinal section of the member sensitive to efforts.

FIG. 3 shows a plan view of the sectors for hand lever movement.

Figure 4:
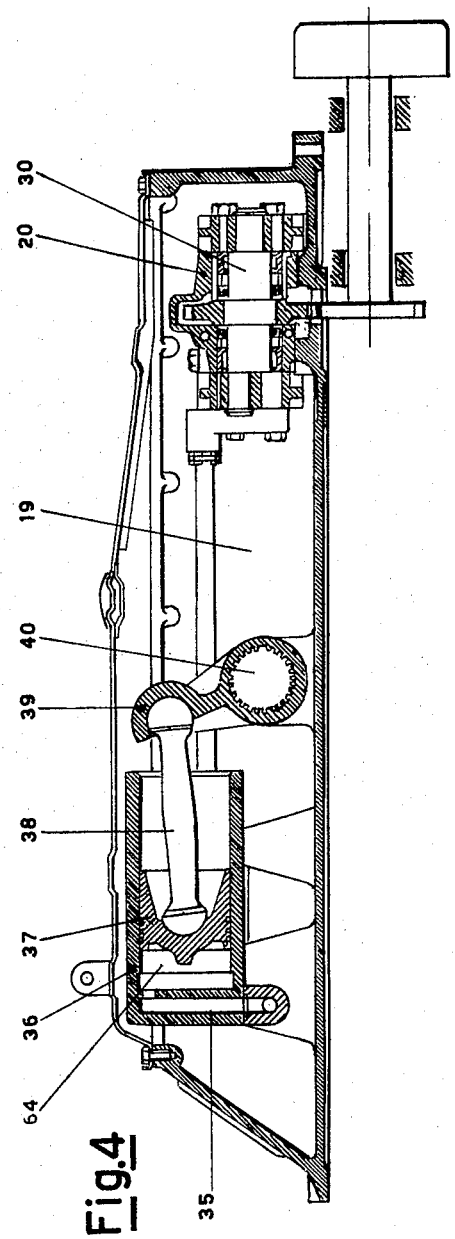
FIG. 4 shows a longitudinal section of the hydraulic device.

Referring now to FIG. 1, a conventional tractor is indicated by 91. A tool, which by way of example is shown as a plow 1, is attached to the rear portion of the tractor.

The tool is carried by the tractor with the well-known and common system called the "three-points system" and is terminated by the end of its curved front rod at the traverse 2 and at a rigid upright 3, which is hingedly connected to the end of an oscillating arm 4 terminated at its other end by a hinge placed on the frame of the tractor.

The traverse 2 is carried by the ends of two lever arms 5, the respective other arms being hinged at the pin 6 provided at a position intermediate of the levers 7 fitted onto the shaft 8, which shaft can turn in supports fixed to the frame of the tractor 91. The end 9 of the lever 7 is connected by means of a pin to the fork 10 (FIG. 2) rigid with the rod 11, which can slide within the washer 12 and the washer 13, kept adherent both, respectively to the box 14 rigidly fixed to the frame of the tractor and to the plug 15 rigid with said box 14 by an elastic body, in the case described as an instance, by the spiral spring 16. At the end opposed to the fork 10, the rod 11 is provided with a stop 90 that engages and drags along the washer 13 during the longitudinal movement towards the rear portion of the tractor, while it can disengage from the washer 13 in the longitudinal movement towards the front part of the tractor, when said washer makes contact with the plug 15.

Similarly, the fork 10 has a plane of contact with the washer 12, which plane engages and drags along the washer 12 during the longitudinal movement of said fork 10, rigid with the rod 11, towards the front part of the tractor, while it can disengage when during the longitudinal movement towards the rear part of the tractor the washer 12 comes to touch the plane of the box 14.

When the tractor is engaged in towing work to tow the tool applied at the ends of the lever arms 5, the lever 7 is stressed to turn towards the rear part of the tractor, being fulcrumed on the shaft 8 and urged by the attachment of the lever arms 5 on the pin 6.

The movement of rotation of the lever 7 approaches progressively the ends of the spring 16, increasing therefore its load progressively, one of its ends being dragged along by the movement of the washer 13 connected to the end 9 of the lever 7, and the other end of the spring which is fixed being adhering to the washer 12 held under pressure against the contact plane of the box 14 rigid with the tractor frame, until attaining the equilibrium between the force of traction needed for the towing of the tool and the energy accumulated by the spring 16.

The two lever arms 5, carrying at one end the traverse 2, and hinged at their other end on the pin 6 of the lever 7, are oscillating on said pin 6 at the command of two links 17 terminated by the levers 18, actuating the described rod system and actuated in turn by the motor apparatus contained in the box 18, which in the example being described is moved by a fluid, namely oil in the specific case, compressed by the pump 20, controlled continually by the tractor engine.

During the transport of the tool, namely when the levers 18 controlled to turn upwards lift the tool out of the ground, the weight of the tool generates thrust efforts upon the lever arms 5 urging the levers 7 to rotate towards the front part of the tractor, being fulcrumed on the shaft 8 and urged by the attachment of the lever arms 5 on the pin 6. The movement of rotation of the lever 7 approaches progressively the ends of the spring 16, increasing therefore progressively its load, one end thereof being dragged along by the movement of the washer 12 connected to the end 9 of the lever 7, and the other end of the spring, which is fixed, being adhering to the washer 13 held under pressure against the plane of contact of the plug 15 rigid with the tractor frame, until attaining the equilibrium between the effort caused by the weight of the tool and the energy accumulated by the spring 16.

Omitting any description regarding the usual modalities of adjustment of positions of the plough with respect to the axes and to the fundamental planes of the tractor, it appears evident from the diagram how definitely the greater or lesser digging-in of the plough depends on the position of the levers 18, which being controlled to rotate upwards lift the plough by way of the above described rod system, or being urged by gravity to rotate downwards permit the penetration of the tool into the ground down to the limit allowed for by the prefixed stroke of rotation.

It further appears evident how the angular position of the lever 7 rotating on the shaft 8 depends essentially on the efforts of traction or thrust acting upon the lever arms 5 as caused either by the towing work of the tool or by the weight of said tool when it is sustained, during transport, or by a load resulting from the difference between the towing effort and the thrust effort, when the traction effort is of slight magnitude and the weight of the tool has to be sustained also during the towing work. With the system according to the present invention, with the manual control lever 21 (FIG. 3) there is obtained the selection of the control system, to be a controlled-position system, a floating system, or a controlled-effort system; in the sector 26 corresponding to the controlled-position system, there is moreover determined gradually the value of the position. However, by acting conveniently upon the lever 21 in the sector of movement corresponding to the controlled position (26 in FIG. 3) one will obtain a gradual lowering of the whole assembly of the rod system of attachment of the tool connected to the levers 18 down to a position corresponding to the position into which the lever 21 has been brought.

Beyond the sector of movement corresponding to the controlled position the lever 21 enters the sector 27 corresponding to the floating system wherewith the tool is completely free in height from any ties with the lifting members, being free to dig into ground, according to the tool's own power to penetrate into ground.

On carrying on the movement of the lever 21 in the sector 28 beyond the sector corresponding to the floating system one acts upon part of the internal lever systems provided for the controlled-effort system for the purpose of rendering said lever systems effective and adapted to effect the control of the effort, the value of which is determined manually by the operator, by his acting upon the lever 22.

It is important to evidence the fundamental prerogative of the system according to the present invention, to be able to have available two distinct work-control systems, namely position-control systems and effort-control systems, also for these systems not to effect the control contemporaneously wherewith the tool is completely united, as regards the maintenance of the original position into which is has been taken by members of its own. The constancy of working depth is entrusted only to the suspension levers 18, the position of which determines at every instant, through the attachment-assembly rod-system, the penetration of the tool into the ground. Further to have available a third control system, called floating system, wherewith the working depth is determined by the tool's own characteristics or by its own sustaining members.

The hydraulic apparatus that takes part with the control of the levers 18 may be synthesized (summarized) by the following fundamental composition, given by way of example without limitation.

In a box 19, which in the specific case is applied in the rear part of the tractor, on the box of the speed-change gear, there are contained the main members for governing the members connecting and suspending the tool to the tractor; in the same box there is also contained the oil needed for the actuation of the motive apparatus and at the same time for the lubrication of all of the members in movement, completely independent of the gear-box of the speed-change transmission and differential gear; thereby are obtained a better behavior and a greater duration of the oil, which is not polluted by the impurities removed by the gears of the transmission (gear-shifting) in movement.

The pump 20 (FIG. 4) contained in the box 19 for the compression of the fluid, of the kind with pistons and valves, is directly controlled by the engine continually also when the detaching of the friction clutch is effected for gear-shifting or for maneuvering.

Figure 5:
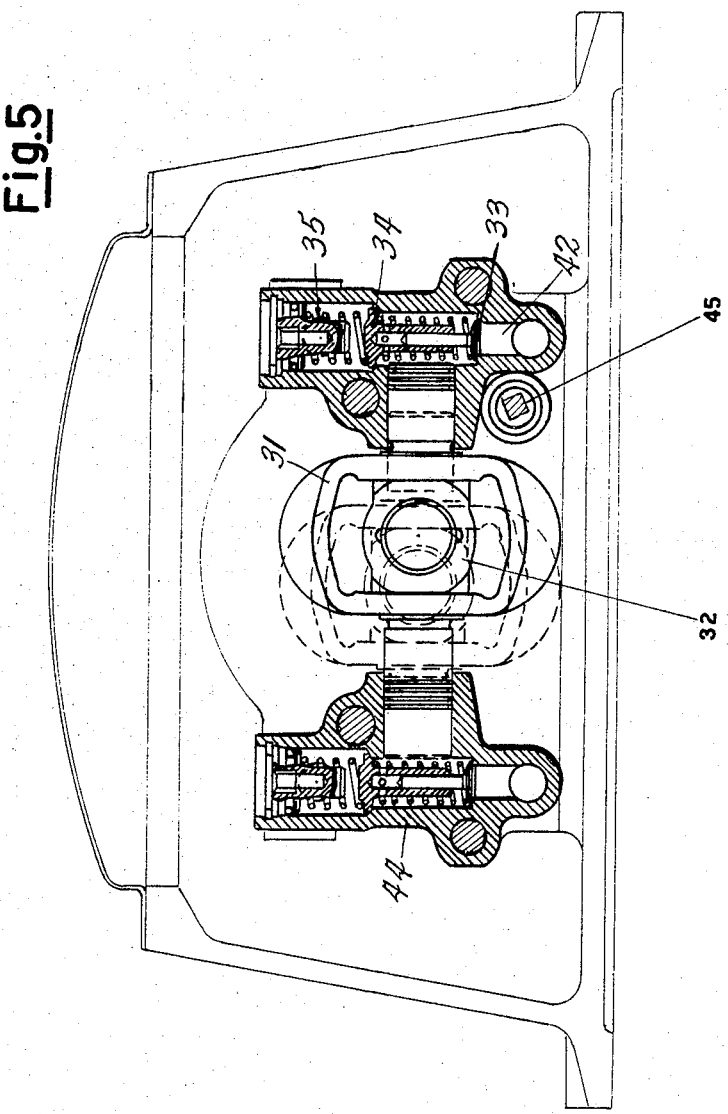
FIG. 5 shows a section of the hydraulic pump on the suction and delivery valves.

The pistons of the pump 31, which are actuated in alternating movement, by means of the bush 32, by the eccentric end of the shaft 30 (as illustrated in FIG. 5) slide in opposite cylinders 44; the compression chamber is in communication with the suction conduits 42 and delivery conduits 35 through the suction valves 33 and delivery valves 34.

Figure 8:
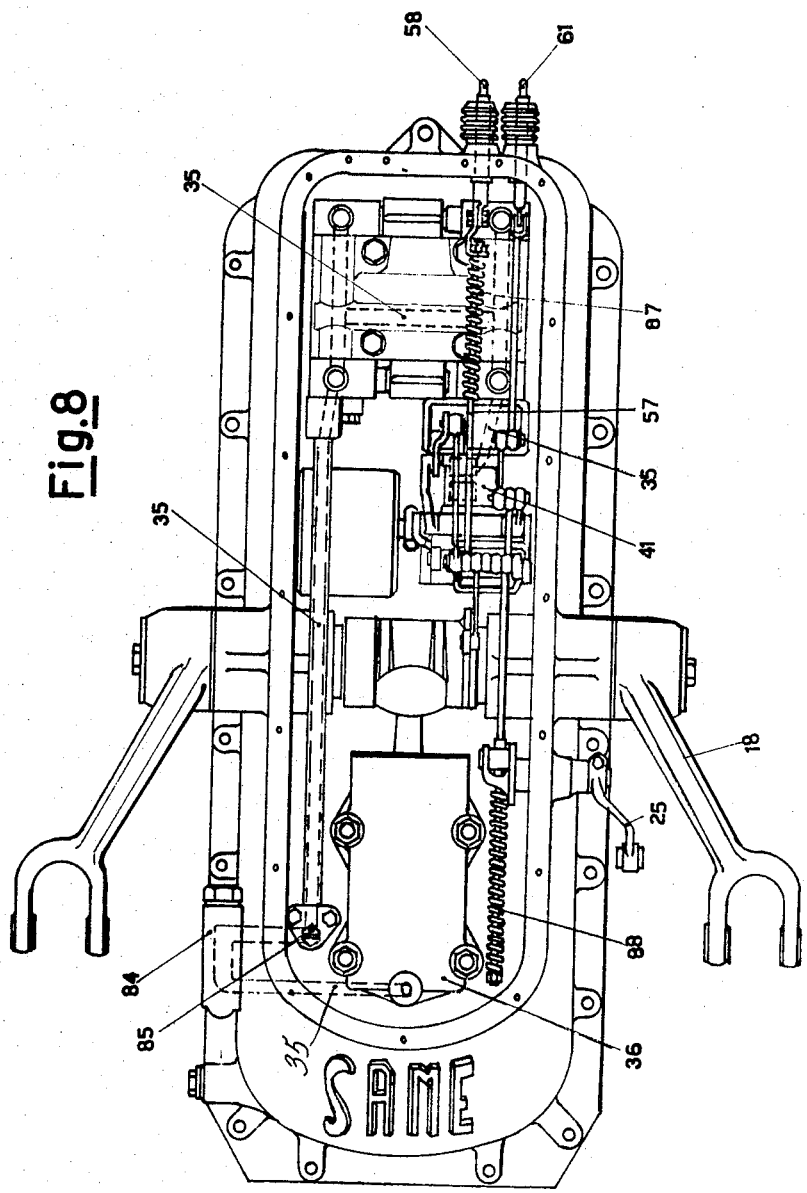
FIG. 8 is a plan view of the hydraulic device.

The delivery conduit 35, on which there is inserted a safety valve 85 (FIG. 8) for the protection of the mechanical members from any possible overpressures is connected directly to the cylinder of the jack 36, actuating the movement for lifting the tool; in the cylinder of the jack there slides the piston 37, which by means of a thrusting connecting rod 38 and internal lever 39 compels the shaft 40 to turn, on which shaft are fitted the external levers 13, which actuate the assembly of the tool-attaching rod-system.

Figure 6:
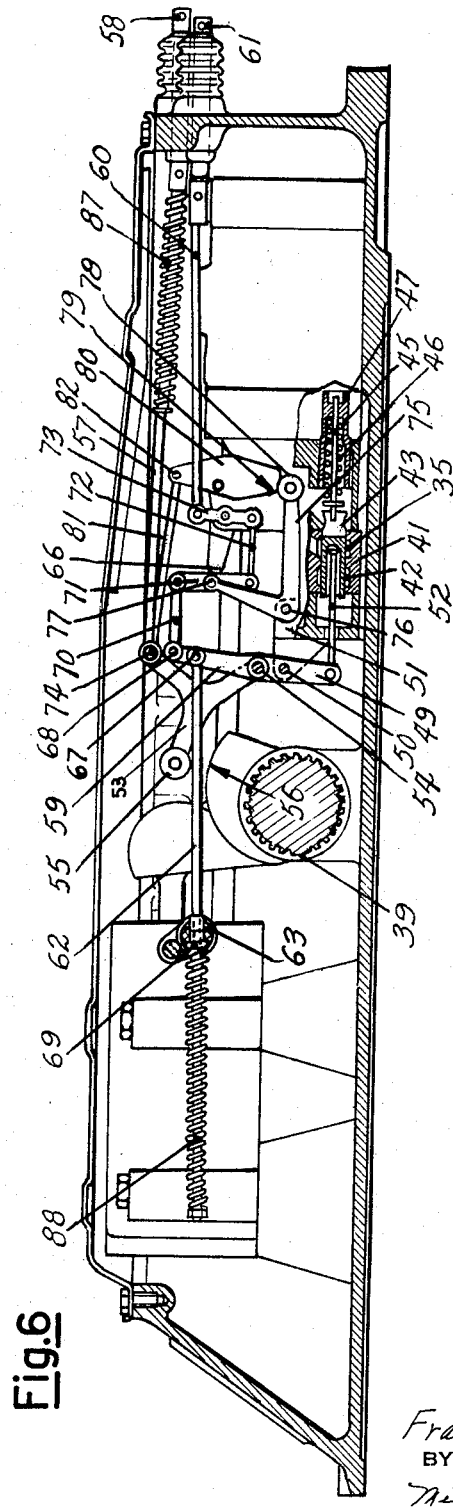
FIG. 6 shows a longitudinal section of the hydraulic device.

The delivery conduit 35 is also connected to an annular chamber in the body 41 (FIGS. 6 and 7) of the distributor; moreover, to another annular chamber, in the same body, there is connected the suction conduit 42 of the pump.

In the three walls forming the two annular chambers there slides the floating stem 43, which in its intermediate position simultaneously closes the suction conduit 42, and the delivery conduit 35. Moving longitudinally in one direction or the other, it puts the oil contained in the box in communication alternately with the suction conduit or with the delivery conduit.

The thrust shaft 45, pushed by the spring 46, actuates the stem 43 in the direction corresponding to the connection of the delivery conduit 35, with the oil contained in the tank.

The stem 43 that in its intermediate position closes the suction-conduit connection as well as the delivery-conduit connection, if pushed by the spring 46 it is left free to effect the stroke, puts the delivery conduit 35 in direct communication with the oil contained in the tank, keeping the suction conduit closed.

In opposition to the movement imposed by the spring, two systems of levers push the stem 43 in the opposite direction taking it beyond the intermediate position and connecting the suction conduit with the oil contained in the tank, closing at the same time the delivery conduit.

Both systems are terminated by the transmission lever 49 pivoted at the point 50 to the support 51, and actuating the stem 43 by means of the push rod 52. The group of levers intervening to effect the control with the "controlled-position system" is composed essentially by an angular lever 53, hinged at the pin 54 of the lever 49, carrying at one end a roll 55 rolling on the eccentric path 56 with which the lever 39 is equipped, and connected at its other end 74 by means of a push rod 57 to the rod 58 longitudinally slidable in the box 19. The rod 58 is connected with the hand-control lever 21. The group of levers acting to effect the control with the "controlled-effort system" is composed by the lever 59 hinged on the pin 54 on the lever 49 connected at its end 68 by means of a link 70, a lever 71, a link 72, a lever 73 and a link 60 to the rod 61 longitudinally slidable in the box 19; the rod 61 is connected with the hand-controlled lever 22; the fulcrum 77 of the lever 71 is sustained at one end of the lever 75 pivoted at the point 76 on a support fixed to the box 19 and the other end whereof is provided with a roll 78 sliding on the shaped path 79 of the cam lever 80 pivoted on a support fixed to the box 19 and connected at its end 82 by means of link 81 with the end 74 of the lever 53.

At the intermediate point 67 of the lever 59 there is connected the link 62 provided with abutment 69 sustained by the lever 63 fitted on the same pin of the external lever 25; the link 62 can be engaged in longitudinal movement by the lever 63 which can act in support to the abutment 69. The external lever 25, performs angular movements proportional to the angular movements of the levers 7, through the control rod 24 and the transmission lever 23 engaged by the fork 10, connected to the lever 7.

On a prolongation of the lever 49 there is applied a roll 86 against which comes to bear the internal lever 39, when the latter is pushed to end-of-stroke; the movement imposed to the prolongation of the lever 49 by a subsequent movement of said lever 39 causes the displacement of the stem 43 of the distributor from the position of aperture of the suction conduit towards the position of closure of all of the circuits, on attainment of which the movement of the lever 39 would be stopped. Now the behaviour of the hydraulic equipment and of the lever systems during the control effected by means of the described systems, will be set forth. The external levers 18 actuating the assembly of the link systems for the attachment for the tool, fitted onto the shaft 40 rotating at a fixed point of the box 19 are actuated downwards by the action of gravity as exerted by the own weight of the tool upon the end 65 by way of the links 17 and upwards by the thrust exerted by the piston 37 upon the hollow end of the lever 39. The piston 37 slides within the cylinder 36 by effect of the pressure exerted in the chamber 64 by the oil coming from the pump 20. It is apparent therefore, that the position and movements of the levers 18 are determined by the amount of oil that is introduced into the chamber 64 or is made flow out from it. The adjustment of the inflow or of the outflow of the oil from the chamber 64 is effected by the distributor 41 which in the case mentioned as an example is of the kind having a distribution shaft with linear movement, while there may be utilized distributors of the kind having circular movement, or with valves.

For the rapid lifting of the tool 1, one acts upon the lever 21, which by means of the push rod 52, of the lever 49, of the angular lever 53 (pivoted on the lever 49 and carrying a roll 55 at one of its ends) and of the push rod 57, controls the displacement of the stem 43 of the distributor. Thus placing the suction conduit 42 of the pump 20 in direct connection with the mass of oil contained in the box 19 and simultaneously closing all the other circuits. Since the delivery conduit 35 of the pump is directly connected to the chamber 64 of the cylinder, the amount of oil sucked by the pump through the aperture of the distributor, will pass into the chamber 64, causing the displacement of the piston 37, which through the thrust of the connecting rod 38 upon the lever 39, will cause the rotation of the shaft 40 of the levers 18 thus causing the links 17 to lift the arms 5 of support of the tool.

Contemporaneously with the rotation on the shaft of the levers 18 and 39, there is the rotation around the pin 40 of the eccentric 56 on which the roll 55 rolls, which is pivoted at the end of the angular lever 53. Thus the position of the lever 21 is kept fixed. The displacement of the end with a roll of the lever 53, as caused by the rotation of the eccentric 56, will displace the end of the transmission lever 49, compelling it to rotate on the centre 50, permitting the stem 43 of the distributor, pushed by the spring 46, to return to the position of closure of the suction conduit. Therefore the flow of oil that displaced the piston 37 is stopped causing therefore stopping the piston in the position attained. The piston 37 being consequently connected to the tool 1, by means of the connecting rod systems previously described, the stoppage of the piston 37 will also involve the stoppage of the tool 1 in the position attained. If the tool is to be lowered, namely if the end 65 of the levers 13 is to be moved downwards, one acts upon the lever 21 which displaces the end of the lever 49 and permits the stem 43 of the distributor, which is pushed rearside by the spring 46, to shift to such position that the delivery conduit 35 and the chamber 64 directly connected thereto, are put in communication with the oil contained in the box 19, closing at the same time, the suction circuits 42 of the pump 20. The flow of oil off the chamber 64 is ensured by the thrust action exerted by the weight of the tool upon the surface of the piston 37, through the connecting rod system 17, 18, 39, 38. The descent of the tool 1 causes the rotation of the lever 39 and simultaneously the rotation of the eccentric 56, which by means of the lever 53 actuated by the roll 55 and by the lever 49, controls the displacement of the stem 43, of the distributor in the position of closure of all conduits, therefore stopping the descent of the tool to the position obtained. This position in which the tool stops, intermediate between the stage of lifting and of descent of the tool, can be defined as an equilibrium position; hence, since this position is determined by the resultant of the position of the lever 21 with the position of the eccentric 56, connected to the lever 18, it becomes apparent how the stop position of the levers 18 and consequently of the tool 1 is in accurate relationship with the position of the lever 21.

Hence the operation of the mechanism has been described that permits the descent and makes the lifting of the tool compulsory, with hand-control of the lever 21; it appears from the description that the tool 1 comes to assume a relative position with respect to the tractor, proportional to the greater or smaller angular displacement of the lever 21.

Now will be described how the automatic maintainment of the working position is obtained with respect to the surrounding ground, which position is predetermined by the operator, the operator also having the possibility of varying at his will said position also during work.

The apparatus equipment adapted to meet the requirements inherent with the attainment of said objects, is constituted by a hydraulic mechanical assembly comprising the attachment members 7, 8, the spring 16, the levers 23, 25, 59, 49, the distributor 43, 41 and the levers 71, 75, 73, 80.

The constitution of the mechanical part from the attachment lever 7 to the distributor-control lever 49 was already described. Now the operation of the hydraulic apparatus equipment controlled by said system of levers will be considered.

It was seen previously that with the varying of the position of the lever 21 there are obtained the lifting, the lowering with consequent stoppage in position, with respect to the tractor, as prefixed by the position of the lever 21, owing to the opening or closing of determined hydraulic circuits. On lowering the lever 21 for a determined sector of movement beyond the position corresponding to the lowest point attainable in the vertical oscillation of the members of attachment of the tool, one puts the roll 55 to a condition of not making any longer contact with the eccentric 56 and, therefore one permits the tool to lower while the system of levers for position control remains uneffective owing to lack of reaction upon the end with roll 55 of the lever 53.

If continuing displacing the lever 21 beyond the sector 26 of movement of the lever 21 corresponding to the position control and the subsequent portion 27 above described, the cam lever 80 dragged to rotate about its own pin, being connected by means of a link 81 to the end of the lever 53, puts the profile 79 at touch with the roll of the lever 75 and successively progressing in movement with the lever 21, the lever 75 controlled at the end with roll 78 rotates about its own pin 76 until the end with pin 77 stops in support on point 66. Then intervenes the automatic operation for the maintaining of the desired depth, through the angular movement of lever 7 that is transmitted to the lever 49. If the distributor stem 43 is not urged by external forces, namely when the lever 49 does not exert thereupon any action, the thrust of the spring 46 keeps it in such a position that the oil of the chamber 64 is made to flow off through the conduit 35 to discharge and, therefore, the emptying of the chamber 64 causes the lowering of the tool 1 through the already described movement of the rod systems 38, 39, 18, 17, 5.

When the lever 49 pushes the distributor stem 43 to end of stroke, there is taking place the connection of the suction piping 42 of the pump 20 with the oil contained in the box 19 and contemporaneously there takes place the closure of the connection of the delivery piping 35 with the discharge.

Under such conditions the outflow of the oil delivered by the pump into the chamber 64 causes the lifting of the tool 1.

Between the two positions indicated there is an intermediate position, which as said previously may be defined an equilibrium position, since it determines such a play of valve system as to prevent the flow of oil into the suction piping 42 and to prevent the outflow of the oil contained in the chamber 64, which remains blocked in practice, therefore keeping the tool in the position attained.

It is easy to see how, with what has been so far described, since the equilibrium position mentioned is obtained in register with only one position of the stem 43 of the distributor, said position can be attained only when the end 54 of the lever 49 has effected the necessary stroke to press the spring 46 by the amount sufficient to permit the stem 43 to go to equilibrium position.

As described, the lever 49 is connected to the levers 7 by means of a connecting rod system having fixed centers. Therefore, these levers may be considered as being in a rigid connection. It is apparent that this connection makes the position of the end 54 strictly interdependent upon the position of lever 7.

Any displacement of the aforesaid equilibrium position of the levers 7, causing proportional displacements of the lever 49 and, therefore, of the stem 43, causes the flowing-in or the flowing-off of the oil into or from the chamber 64 respectively, with consequent displacement of the levers 18. In reality however the centers of the connecting-rod system may be considered to be fixed only under determined conditions, since as already said, the end point 68 of the lever 59 is connected by means of links 70, 72, 60 to the lever 22 the movement of which therefore determines the displacement of the end point 68, which displacement in turn modifies the positional conditions which had been apt to make the equilibrium position become attained by the stem 43. Consequently there is the important prerogative that actually the relative position of the lever 7 adapted to maintain the stem 43 in equilibrium position is unique, true, but variable for every position of the lever 22, and, therefore, it appears evident how, the relative position, of the levers 7 being determined by the effort of traction and, therefore, for a given tool working in a given ground determined by the depth of work of the tool, the position of the lever 22 is that establishing the depth of work, in correspondence with which the distributor 43 is kept in equilibrium position; every variation of depth, causing displacements on the distributor, causes corresponding movements on the levers 18 which are adapted to restore the previous conditions, that is to say, definitely, to keep the depth of working unaltered. As set forth above, referring to the controlled-effort operation, it was said that the pin 77 being the fulcrum of the lever 71 carried by the lever 75 during the controlled-effort operation, should be taken against the supporting point 66 by means of the cam lever 80 acting upon the end with roll 78 of the aforesaid lever 75.

Figure 7:
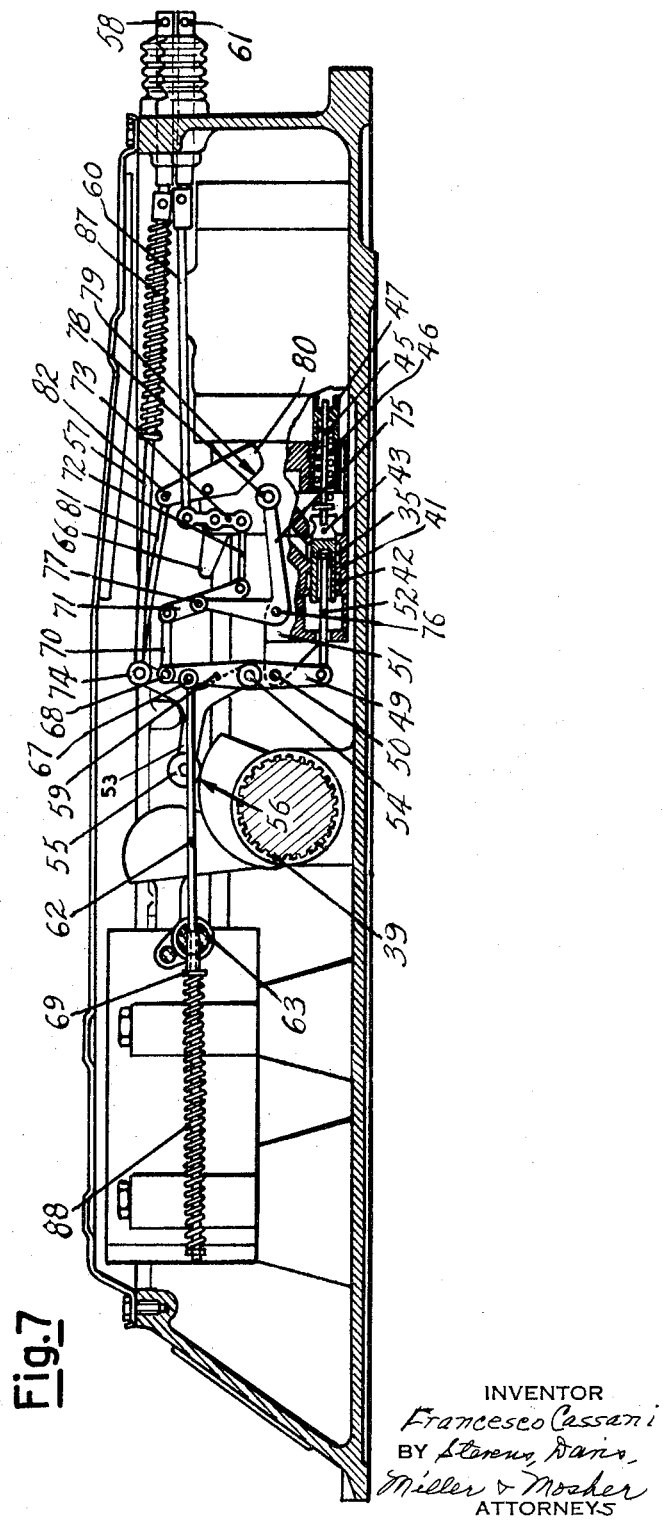
FIG. 7 shows a longitudinal section of the hydraulic device.
Figure 9:
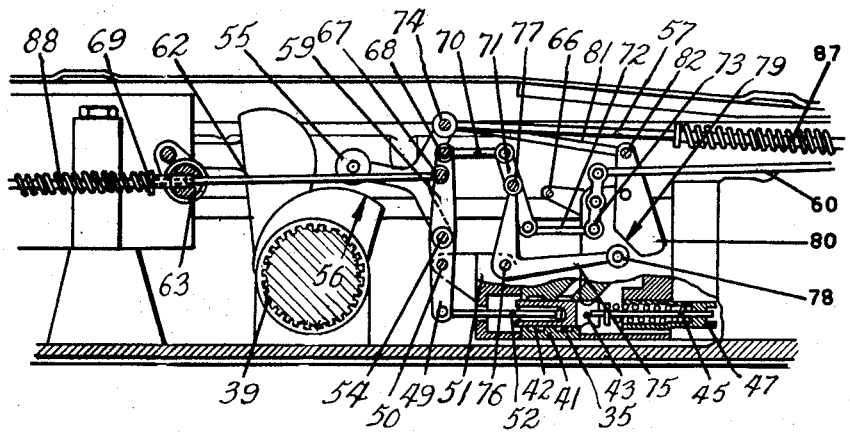
FIG. 9 is a partial section of the device.

In fact by rotating the lever 80 into the position marked in FIG. 7 or in FIG. 9 corresponding to the sector of movement of the lever 21 regarding the controlled-position system or the floating system, the lever 75, having its end with the roller 78 out of engagement with the lever 80, permits the end with the pin 77 to go away from or near to the supporting point 66 if controlled by other forces.

Now the spring 46 by means of the push shaft 45 displaces the distributor stem 43 in the direction corresponding to the connection of the delivery conduit 35 with the oil contained in the tank causing the outflow of the oil from the chamber 64 with the corresponding digging-in of the tool 1.

The consequent increase of towing effort causes the displacement of the lever 25 which, after the contact-making of the lever 63 with the abutment 69, causes the displacement, towards the rear part of the tractor, of the link 62 connected to the point 67 of he lever 59. The movement of the point 67, which in the description relating to the controlled-effort system found reactions at the end 68 and caused the displacement of the end 54 with consequent rotation of the lever 49 on the pin 50 and relative movement of the distributor stem 43 until attaining the equilibrium position, finding now reaction at the end 54 due to the force of the spring 46, displaces towards the rear, part of the tractor the point 68 connected by means of link 70 to one end of the lever 71 fulcrumed at the pin 77 of the lever 75 which is free to move and get away from the supporting point 66; successive movements of the lever 22 with consequent displacement of the end connected with the link 72 of the lever 71 obtain the result of further displacing the end with pin 77 of the lever 75 without exerting any influence upon the position assumed by the distributor stem 43. Hence, whatever the position of the lever 22 may be and whatsoever towing effort will permit the descent of the attachment and of the tool therewith.

Hence it becomes demonstrated how it is possible to effect the selection among the controlled-position system, the floating system and the controlled-effort system, by actuating conveniently in the special sector of movement the lever 21; moreover it becomes demonstrated how there cannot exist the contemporaneous intervention of the controlled-position system and of the controlled-effort system; therefore, how, during the transport of the tool sustained with the controlled-position system, the controlled-effort system cannot intervene whatsoever the position of adjustment of the lever 22 may be; moreover, how between the two sectors of movement of the lever 21 corresponding to the controlled-position system, and the controlled-effort system, there is available a sector of movement wherein the two controlled-position systems are not effective to actuate the distributor stem 43 and, therefore, the levers 18 and with them the tool 1 are free to lower in any position of their own sector of vertical oscillation.

We have described the mechanical composition and the behaviours of each individual group composing the control station and the connecting members; now we shall see the operation in practice of an apparatus equipment as described, which may be exemplified as follows.

The tractor-and-tool assembly faces work with its tools completely lifted; that means that previously the operator had taken the lever 21 to a position to which corresponds the lifted position of the tool and, therefore, the oil flowed into the chamber 64 through the suction and delivery conduits of the pump, which is allowed for by the position assumed by the distributor stem 43 as long as the tool was lifting up to the position corresponding to that given by the lever 21, in which position it stopped owing to the displacement of the distributor stem 43, due to the rotation undergone by the eccentric 56 consequently to the rotation of the levers 18, 39. In the lifted-tool position, the lever 7 finds itself in the position corresponding to the value of the load acting upon the arms 5, balanced by the springs 16 (a thrust action bearing on the arms which is caused by the weight of the tool, the levers 7 find themselves shifted towards the front portion of the tractor). The internal lever 63 does not exert any force upon the link 62, and the end 68 is free to oscillate as a consequence of the freedom of movement of the lever 75.

To prearrange the assembly for the depth of work to be attained, the operator displaces the lever 22 in register with the position to which the desired depth of work corresponds.

The displacement of the lever 22 has as its only effect to displace the link 72 and the end of the lever 71 connected thereto; the internal lever 63 still cannot exert any action upon the link 62, at the conditions prevailing at the time (tool lifted).

To lower the tool 1, the operator displaces the lever 21 from the lifted position to the sector 27 of movement corresponding to the controlled-effort system, permitting the maximum lowering of the tool.

The shifting of the lever 21 causes the shifting of the lever 53 and permits the shifting of the lever 49 and of the distributor stem 43 in such position as to put the delivery piping 35 in communication with the oil tank and, therefore, the oil contained in the chamber 64 can flow off freely.

The displacement of the lever 21 in the sector of movement corresponding to the controlled-effort system has moreover caused the displacement of the cam lever 80 which acting with the shaped path 79 upon the end with roll 78 of the lever 75, has taken the latter with its end with pin 77 rigidly at touch with the supporting point 66.

Hence the end 68 of the lever 59 assumes a position determined by the position assumed by the link 72 put in position by the displacement effected by the operator upon the lever 22.

By effect of the emptying of the cylinder, the end 65 of the lever 18, urged by the weight of the tool, is free to shift downwards and consequently are displaced downwards the lever arms 5 of support of the tool, which, therefore, in concomitance with the translatory movement of the tool, penetrates into the ground ("digs-in").

At the time at which, during descent, the tool touches the ground, the lever 63 finds itself still detached from the abutment 69 of the link 62 and the outflow ports of the distributor are still open, while the inflow ports for entrance into the pump are closed and the tool is free to continue its descent. As the tool is penetrating into the ground, there are produced efforts of traction upon the lever arms 5, progressively increasing with the increase of working depth, which drag in proportional angular movement the levers 7; the movement of the levers 7 causes, by means of the already described connection with fork 10, lever 23, rod 24, lever 25, the approaching of the lever 63 to the abutment of the link 62 and the subsequent dragging of the lever 59, which through the lever 49 and the rod 52 controls the gradual displacement of the stem 43 of the distributor; the stroke of the stem has the consequence of the progressive closure of the outflow ports until attaining the equilibrium position; in that position the oil contained in the chamber 64 is blocked; consequently the movement of descent of the tool is stopped, the movement of angular rotation of the levers 7 ceases, consequently the movement of the lever 59 ceases and the connecting-rod system stops in the equilibrium position.

It becomes apparent from all that has been set forth, that the equilibrium position of the stem 43 can be attained at any point predetermined by the descent of the tool, since it substantially depends on the position in which the end 68 of the lever 59 finds itself, since it is on that position that it depends whether the equilibrium position of the intermediate point 67 can be attained only at the beginning of the movement of the lever 63 or after an ampler movement; and since the position of the point 67 is determined by the position of the lever 22 it appears evident how on that position there may depend the depth of work not only for the purposes of pre-arrangement, but also for those of the variations during work. In fact, if the depth of work is to be increased, the operator acts upon the lever 22, with such a displacement as to cause a shifting of the end point 68 of the lever 59 towards the rear portion, and since at the time the central point 67 is tied to the position of the levers 7, the spring 46 in exerting a thrust action displaces the stem 43 in a condition for opening the outflow ports; the emptying of the chamber 64 causes the lowering of the tool, the increase of the effort of traction and the displacement of the levers 7 with the consequent movement at the intermediate point 67 of the lever 59 that restores the stem 43 to the equilibrium position as soon as the tool has attained the depth corresponding to the position given to the point 68, therefore to the lever 22.

To diminish the depth of work the operator displaces the lever 22 in a direction contrary to the preceding one; the point 68 shifts towards the front side of the tractor and consequently the lever 59 shifts in front around the instantaneous fulcrum 67, compelling the lever 49 that moves by way of a rocker on the piece 50, to exert a thrust action upon the stem 43, displacing it from the equilibrium position to the position of aperture of the suction ports 42 for suction of the oil to the pump and through the delivery conduit 35 to the chamber 64 of the cylinder.

By effect of the pressure upon the piston 37, the tool is lifted, the consequent angular variation of the levers 7 causes the displacement of the intermediate point 67 of the lever 59 and the spring 46 restores the stem 43 to the equilibrium position as soon as the tool is lifted by the amount pre-arranged by the lever 22.

The descriptions of the modality of operation of the mechanical-hydraulic assembly for the modifications of the depths of work, constitute an implicit description of the operation of said assembly to keep the constancy of the depth of work as prefixed by the position of the lever 22. In fact, it is evident that since every variation of depth involves a positive or negative variation of the position of the lever 7, this variation is automatically reported on the lever 59, which acts displacing the distributor 43 from the equilibrium position to the position that permits the flowing-in of oil into the chamber 64 or the flowing-out from the latter in an amount sufficient to cause on the suspension levers 18 such lifting and lowering movements as to restore the tool to the initial depth and, consequently, the distributor stem 43 to the equilibrium position.

Figure 10:
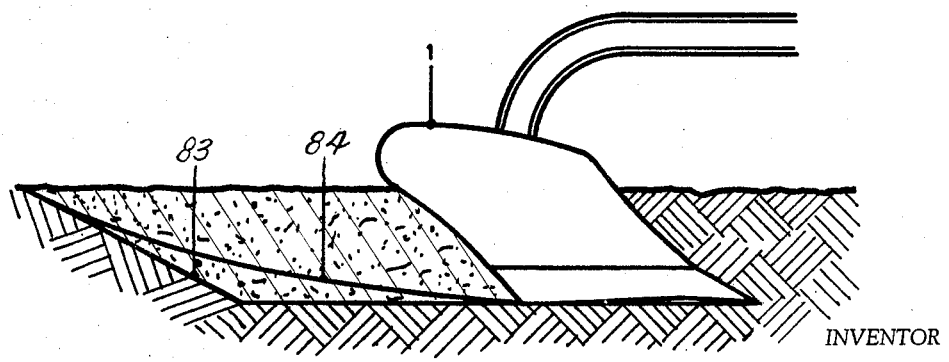
FIG. 10 is a section of the beginning of a furrow, during ploughing.

One of the prefixed objects is that of permitting the tool to dig into ground with the maximum possible incidence so as to reduce to minimum the part of ground worked at a depth lower than the value determined by the operator (83, FIG. 10).

We have seen how the gradual digging of the tool into ground, causing the proportional angular movement of the levers 7 through a special connection, causes the progressive closure of the flowing-off ports (discharge ports), therefore diminishing gradually the outflow-speed of the liquid and, therefore, gradually diminishing the speed of flowing-off of the liquid and, therefore, diminishing the speed of digging-in of the tool progressively with the approaching to the selected depth of work (84, FIG. 10).

To obviate said inconvenience the operator displaces— for the lowering of the tool—the lever 21 from the position corresponding to the tool lifted in the sector 27 of movement of the said lever, corresponding to the floating system.

The lever 53 shifts in position so as not to be able to influence the position of the distributor stem 43 which therefore is pushed by the spring 46 in such position as to put the delivery piping 35 in communication with the oil tank.

The movement of the lever 21 has moreover caused the displacement of the cam lever 80 by an amount not sufficient to actuate the lever 75 which, therefore, being able to oscillate on the pin 76, permits the point 68 to oscillate; hence the angular movement of the levers 7 due to the progressive increase of the effort of traction, acting through the already described connection upon the point 67 of the lever 59, the point 68 being free to oscillate, cannot displace the distributor stem 43 which, therefore, remains in the position of complete aperture of the flowing-off ports for the liquid, permitting the rapid digging-in of the tool.

On having rapidly attained the desired depth, the operator acts upon the lever 21 taking it to the sector 28 of movement corresponding to the controlled-effort system, which controlled-effort system will assume the control of the actuator by means of lever-systems and according to the modalities already described.

It may happen that the operator in moving the levers 21 or 22 performs a greater movement than the two lever systems controlling the distributor stem 43 could effect. To protect all of the members affected from an excessive overload and from the danger of permanent breakage or deformation, there are inserted into the system elastic members which momentarily absorb the excessive movements.

For that purpose the push-rod 57 is equipped with a spring 87 and the link 62 with a spring 88, all with the possibility of becoming compressed in the eventuality of an overload and of becoming restored to the primitive condition on the ceasing thereof.

During the descent of the tool from the lifted position, in a special way with heavy tools, it may happen that the tip of said tool comes to hit against stones or hard bodies existing in the ground with consequent danger of breakage or bending of the tip. Therefore, it is useful to limit the speed of descent of the tool, but the speed of descent necessary for the safeguard of the tools may be insufficient as a speed of release of the tool during the control of work by the controlled-effort system or the time employed by the tool to perform the entire descent may result to be high.

To meet said needs there is inserted along the conduit 35 a delivery regulator 92 which, while it allows free flow from the pump 20 to the chamber 64, limits the speed of outflow from the chamber 64 to the tank and, therefore, the velocity of descent of the tool to a nearly constant value whatever the weight of the tool may be, but the intervention (action) of which is conveniently delayed so as to allow a quick reaction for the corrections of depth during the control of work with the controlled-effort system and so as to obtain the limitation of speed during the descent of the tool only after a stroke covered at more elevated speed in order to reduce the total time of descent.

The delivery-regulator is formed by a calibrated orifice and by a regulator to keep unvaried the difference of pressure before and after said orifice, which difference of pressure is kept at a limited value of some kg. cm.$^2$, if the oil stream flows from chamber 64 to the oil tank: the pressure regulator does not intervene (act) if the oil stream goes from the pump 20 to the chamber 64 and, therefore, in that direction the oil under pressure of the pump is free to flow into chamber 64.

Figure 11:
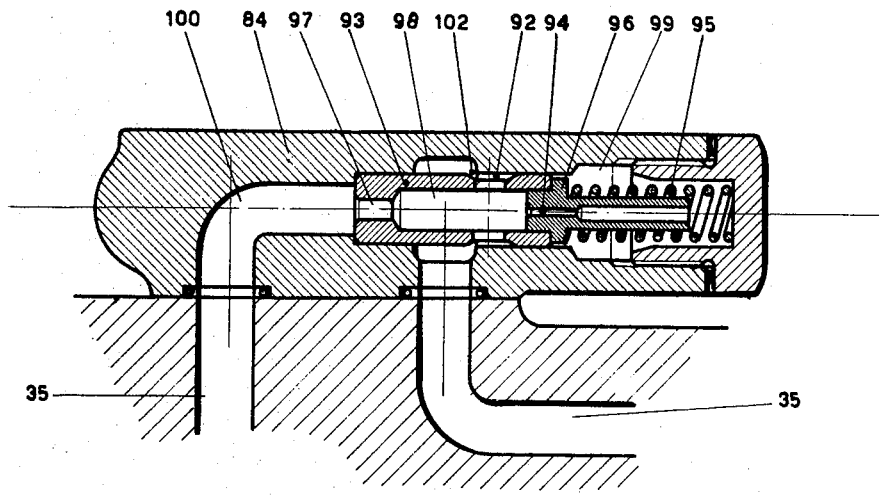
FIG. 11 is a partial section on the regulator.

The delivery regulator is essentially constituted by a body 84 (FIG. 11) in the seat 92 of which is slidable a floating piston 93 provided with a calibrated orifice 97 and pushed in a direction by a gauged spring 95; a pushrod 96 with calibrated orifice 94 is interposed between the spring 95 and the piston 93.

The stream of oil leaving the chamber 64 to permit the lowering of the tool, enters the chamber 100 and passing through the calibrated orifice 97 into chamber 98 it passes into the conduit 35 through the passageway 102.

The oil stream in passing through the calibrated orifice 97 determines a difference of pressure between the chamber 100 and the chamber 98 and 99.

When said difference of pressure, caused in an amount proportional to the flowing speed, acting upon the surface of the piston corresponding to the chamber 100 and upon the surface of the piston corresponding to the chamber 99, owing to the excessive speed of the oil in the orifice 97, generates a difference of pressure greater than the gauge value of spring 95, the piston 93 shifts to gradually restrict the passageway 102 in such a way as to limit in said passageway the flowing-off of the oil and, therefore, as to limit the speed of flowing-off of the oil from the orifice 97, to the value corresponding to the gauging value of the spring 95. Therefore, the constancy of oil-passage speed is kept up in the orifice 97 and therewith the flowing-off speed of the oil from chamber 64 and, therefore, the speed of descent of the tool. The oil contained in the chamber 99, during the shifting of the piston 93 to determine the partial closure of the passageway 102, passes through the calibrated orifice 94 into the chamber 98, causing a slowing-down to the displacement of the piston 93 and, therefore, a delay to the attainment of the position of the piston 93 corresponding to the opening of the passageway 102 and adapted to maintain the speed of descent to the gauging value.

It follows therefrom that in that period of time the tool descends with higher speed useful to reduce the time of descent of the tool and useful for the correction of depth of work during the control of work with the controlled-effort system; the slowing-down of movement of the piston 93 is gauged in such a manner as to attain the limited speed before the tool—which had been lifted completely—reaches the supporting plane for the tractor.

With the valve means of the kind indicated by way of example, the stem 43 slides in longitudinal direction to perform its own function, while it responds in satisfactory manner at low pressures, it may behave in defectuous manner at high pressures, of the order of magnitude of 100 kg. cm.² and more, when the stem is held unmoved for a long time owing to insinuations of liquid on one side of the valve stem that presses to shift the stem eccentrically until detaching the oil film and to contact the metallic surface of the piston until causing sticking.

Then it may happen that, while during the control with the controlled-effort system the sticking does not take place owing to the continual corrections due to the jumps and jerks of the tractor, during the control with the controlled-position system or during the transport of the completely lifted tool, when the sticking has occurred in maneuvering the lever 21 to cause the lowering of the tool, the force of the spring 46 is not sufficient to carry out the displacement of the stem 43.

Figure 12:
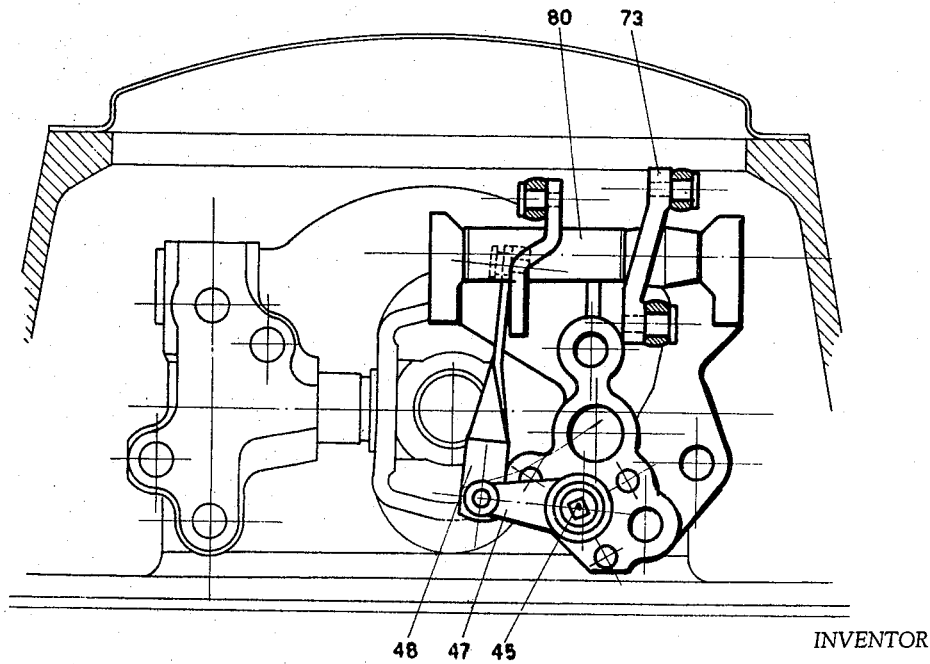
FIG. 12 is a partial section of the device.

This defect can be substantially reduced by reducing the length of the surfaces of the seat and polishing with accuracy the surfaces of the stem and respective seat but they do not sufficiently warrant operation. To obviate or attenuate said defectuous behavior, the stem 43 is made to rotate around its own axis each time the lever 21 is actuated manually, in such a manner as to detach the metallic parts at contact and to permit the convenient longitudinal displacement of the stem 43. To that end, a lever 47 (FIG. 12), provided with a polygonal hole, in which a polygonal portion of the thrust shaft 45 slides, is moved pendularly, having one end connected by the link 38 to the lever 80, each time the lever 21 is moved.

The end of the shaft 45 at contact with the stem 43 of the distributor, penetrates into the latter with an indentation, whence the alternate movements of the lever 47 impose an angular movement of the stem 43 which will become unlocked and disengaged from its respective seat.

I claim:

1. A device for lifting and lowering a tool carrying attachment mounted on an engine-driven tractor, said device comprising a hydraulic system, a control valve means actuated by a first system called position control system for attaining and maintaining the position of the attachment relative to said tractor and by a second system called draft control system for maintaining the constancy of the effort of traction upon the tool, said first system including a first manually operated element, first connecting means actuated by said first element and cam means rotatable with the lifting and lowering of the tool carrying attachment, said first element cooperating with said first connecting means and said cam means for the actuation of the valve means by the position control system, said second system including a second manually operated element, second connecting means actuated by said second element, draft responsive means displaceable by the variable force of traction upon the attachment, said second element cooperating with said second connecting means and said draft responsive means for the actuation of the valve means by the draft control system, and third connecting means actuated by said first element and acting upon said second connecting means and said draft responsive means for the actuation of said valve means by the draft control system, said first manually operated element moved to a first portion of its own sector of movement actuating said first connecting means which in turn cooperates with the cam means for the actuation of the valve means for the attainment and the maintenance of a position of the attachment relative to the tractor, said first manually operated elements, in a second portion of its sector, actuating said third connecting means to act upon said second connecting means to make them operative with said means displaceable by the variable force of traction, for the actuation of said valve means, and for the maintenance of the effort upon the attachment while it actuates said first connecting means to leave the range of positions in which they can cooperate with the cam means rotatable with the lifting and lowering of the attachment, said first manually operated elements in a third portion of its sector actuating said third connecting means to a position wherein said second connecting means is ineffective to position said valve in response to movement of the draft responsive means, said second connecting means including a first lever pivoted at a fixed point on the tractor, one end of said first lever having roll and the other end carrying a second lever oscillatably pivoted thereon, said third connecting means including a cam surface bearing on the roll of said first lever when said first manually operated element is moved in the second portion of its own sector of movement.

2. A device according to claim 1, wherein said second lever is connected by one of its ends to said second manually actuated element and the other end of it is connected to the end of a third lever, third lever actuating with its opposite end the valve means and having an intermediate point connected to said means displaceable by the variable force of traction upon the attachment.

3. A device according to claim 2 wherein said first and second connecting means include elastic elements adapted to absorb any possible movements of the manually operated elements greater than the allowable movement of the valve means.

4. A device according to claim 3 wherein said draft control system includes sensitive elements that react to both the efforts of traction and thrust applied to the tool.

5. A device according to claim 4 wherein the lowering of the tool takes place by discharging the liquid from a hydraulic actuator and wherein an automatic regulator device maintains the lowering speed at a predetermined valve.

6. A device according to claim 5 wherein said automatic regulator device acts with a delay determined by a calibrated orifice to permit an initial lowering at a greater speed.

7. A device according to claim 6 wherein the valve means are of the kind having a stem with longitudinal movement actuated by unidirectional lever system, with actuation in the opposite direction effected by spring means, and where to unlock the stem possibly sticking to its own seat there is imparted to said stem a transversal oscillatory movement every time said first manually operated element is moved.

References Cited by the Examiner

UNITED STATES PATENTS

| | | | |
|---|---|---|---|
| Re. 25,415 | 7/1963 | Merritt et al. | 172—9 |
| 2,721,508 | 10/1955 | Edman | 172—9 |
| 2,996,124 | 8/1961 | Bunting | 172—9 |
| 2,996,125 | 8/1961 | Bunting | 172—4 X |
| 3,083,777 | 4/1963 | Maughan | 172—9 |
| 3,095,933 | 7/1963 | Bunting | 172—7 X |

FOREIGN PATENTS

| | | |
|---|---|---|
| 1,082,442 | 5/1960 | Germany. |
| 883,643 | 12/1961 | Great Britain. |

ABRAHAM G. STONE, *Primary Examiner.*

T. GRAHAM CRAVER, *Examiner.*